March 1, 1966    V. G. RISTVEDT ET AL    3,237,536
PRE-CRIMPED COIN WRAPPER FORMING MACHINE
Filed June 27, 1963                                7 Sheets-Sheet 1

INVENTORS
VICTOR G. RISTVEDT
RICHARD W. BUSKENS
BY
ATTORNEY

March 1, 1966

V. G. RISTVEDT ET AL 3,237,536

PRE-CRIMPED COIN WRAPPER FORMING MACHINE

Filed June 27, 1963

INVENTORS
VICTOR G. RISTVEDT
RICHARD W. BUSKENS

BY

ATTORNEY

March 1, 1966   V. G. RISTVEDT ET AL   3,237,536
PRE-CRIMPED COIN WRAPPER FORMING MACHINE
Filed June 27, 1963   7 Sheets-Sheet 5
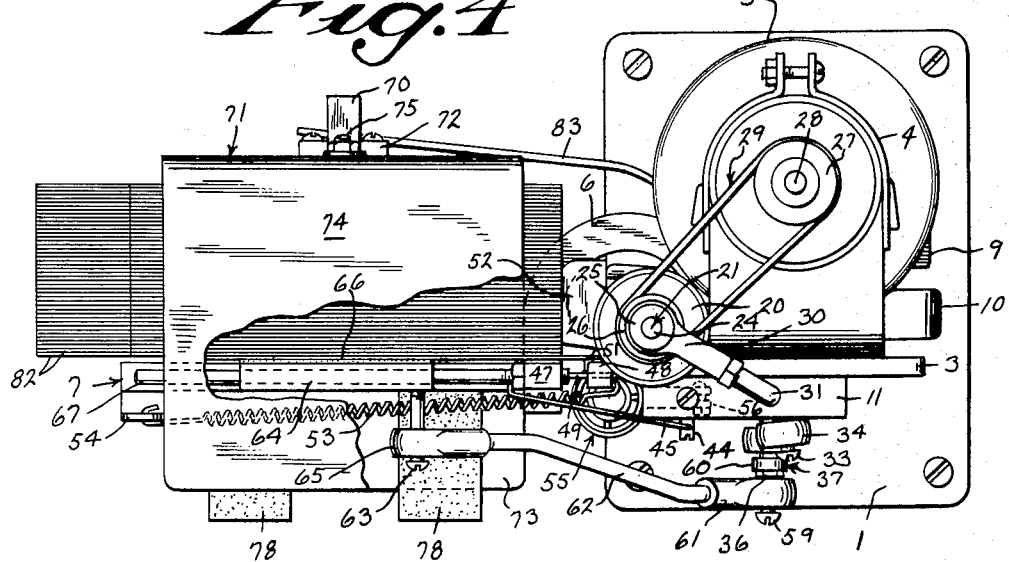
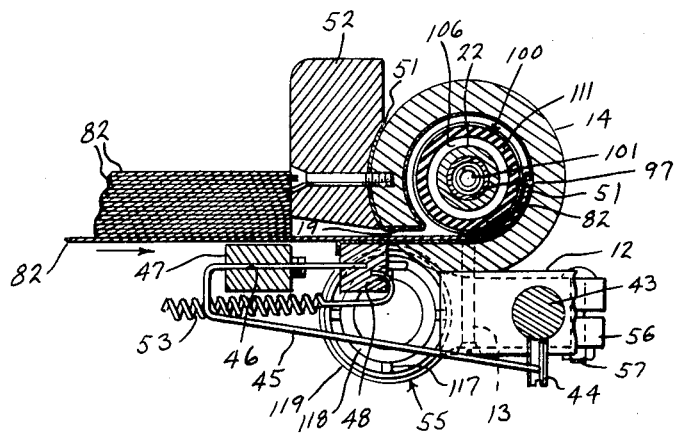
INVENTORS
VICTOR G. RISTVEDT
RICHARD W. BUSKENS
BY
ATTORNEY March 1, 1966 V. G. RISTVEDT ET AL 3,237,536
PRE-CRIMPED COIN WRAPPER FORMING MACHINE
Filed June 27, 1963 7 Sheets-Sheet 4

INVENTORS
VICTOR G. RISTVEDT
RICHARD W. BUSKENS

BY Adrian L. Bateman Jr.

ATTORNEY

March 1, 1966  V. G. RISTVEDT ET AL  3,237,536
PRE-CRIMPED COIN WRAPPER FORMING MACHINE
Filed June 27, 1963  7 Sheets-Sheet 5
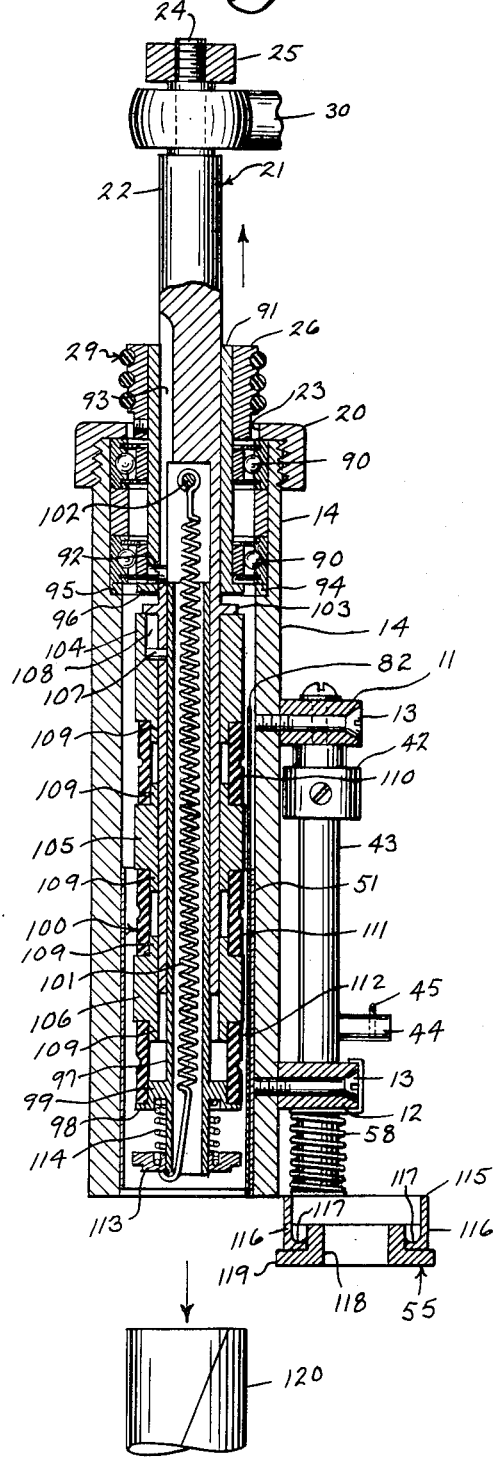
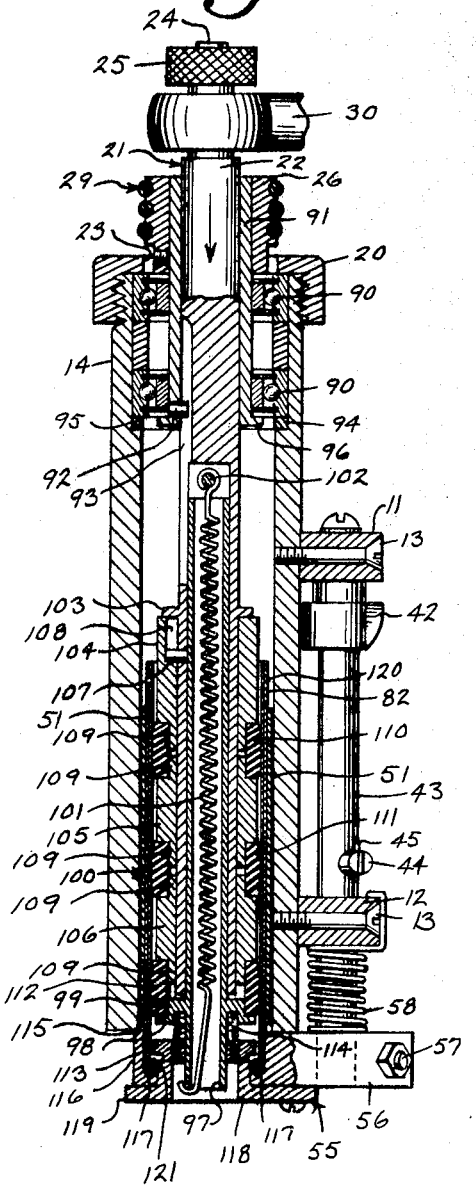
INVENTORS
VICTOR G. RISTVEDT
RICHARD W. BUSKENS
BY
ATTORNEY March 1, 1966  V. G. RISTVEDT ET AL  3,237,536
PRE-CRIMPED COIN WRAPPER FORMING MACHINE
Filed June 27, 1963  7 Sheets-Sheet 6
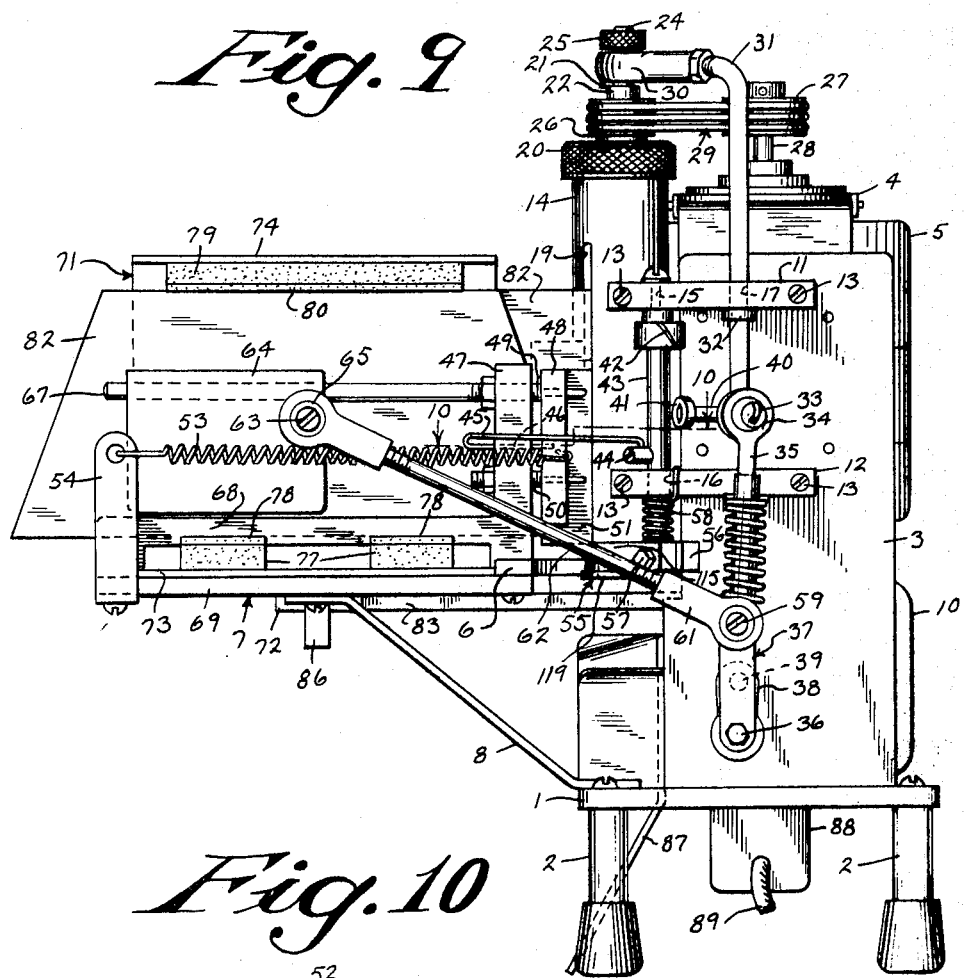
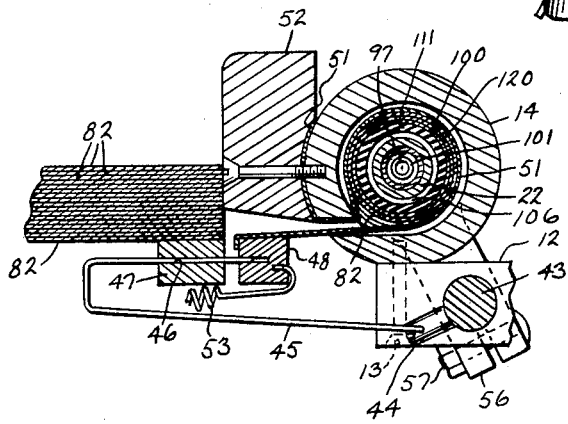
INVENTORS
VICTOR G. RISTVEDT
RICHARD W. BUSKENS
BY
ATTORNEY March 1, 1966  V. G. RISTVEDT ET AL  3,237,536
PRE-CRIMPED COIN WRAPPER FORMING MACHINE
Filed June 27, 1963  7 Sheets-Sheet 7

INVENTORS
VICTOR G. RISTVEDT
RICHARD W. BUSKENS

BY *Adrian L. Bateman Jr.*

ATTORNEY

United States Patent Office 3,237,536
Patented Mar. 1, 1966

3,237,536
PRE-CRIMPED COIN WRAPPER FORMING MACHINE
Victor G. Ristvedt, Nashville, Tenn., and Richard W. Buskens, Gulf Shores, Ala., assignors to Brandt Automatic Cashier Company, Watertown, Wis., a corporation of Wisconsin
Filed June 27, 1963, Ser. No. 291,027
10 Claims. (Cl. 93—81)

The present invention relates to a coin wrapper forming mechanism comprised of a rotatably mounted mandrel about which a wrapper blank is formed; a former mounted adjacent said mandrel and adapted to contract toward and release away from said mandrel's cylindrical surface to guide the wrapper blank about the mandrel; a crimping die movably mounted to be positioned adjacent a bottom end of said mandrel; and a mechanism sequentially causing the former to contract toward the mandrel and guide a wrapper blank between the mandrel and the former, causing an end of the formed wrapper blank to be forced against said crimping die to roll its end edges inward, and releasing the thus formed and crimped wrapper from the mandrel.

To facilitate the counting and handling of coins of the various denominations, banks and other businesses and institutions sort and stack the coins in convenient amounts in paper tube wrappers. If any substantial sums are involved, manual performance of the sorting, counting and packaging of coins becomes prohibitively laborious, time consuming and expensive. Automatic coin sorting, counting and wrapping machines are available for handling large amounts, but these require preformed, cylindrical wrappers having one end pre-crimped to form a bottom of the wrapper. Since only the largest handlers of coin have had sufficient need for such pre-crimped wrappers to justify the purchase of the expensive, high output pre-crimped coin wrapper forming machines, it has been common for most users of automatic sorters, counters and wrappers to purchase pre-crimped coin wrappers from suppliers. However, the large bulk of such wrappers for their weight has caused many problems and excessive expense in their handling and storage.

Hence, a need has long existed for a small, portable, inexpensive coin wrapper forming machine adapted to the needs of businesses and smaller banks where sufficient coin is handled to require automatic equipment, but where the sums handled are not great enough to justify the acquisition of the large wrapper forming machines heretofore available. The present invention is able, for the first time, to fill that need, as a result of the simplified mechanical structure conceived, and hereafter disclosed, whereby the wrapper forming and crimping functions may be effectively and economically performed.

Accordingly, it is an object of the present invention to provide a portable coin wrapper forming machine.

It is another object of the present invention to provide an inexpensive coin wrapper forming machine.

It is another object of the present invention to provide a coin wrapper forming machine that can readily be operated by inexperienced clerical personnel.

It is another object of the present invention to provide a coin wrapper forming machine capable of forming and crimping a coin wrapper on a single mandrel in conjunction with a former and a crimping die.

The foregoing and other objects will appear in the description to follow. In the description, reference is made to the accompanying drawings which form a part hereof and in which there is shown by way of illustration a specific embodiment in which this invention may be practiced. This embodiment will be described in sufficient detail to enable those skilled in the art to practice this invention, but it is to be understood that other embodiments of the invention may be used and that structural changes may be made in the embodiment described without departing from the scope of the invention. Consequently, the following detailed description is not to be taken in a limiting sense; instead, the scope of the present invention is best defined by the appended claims.

Figure 1:
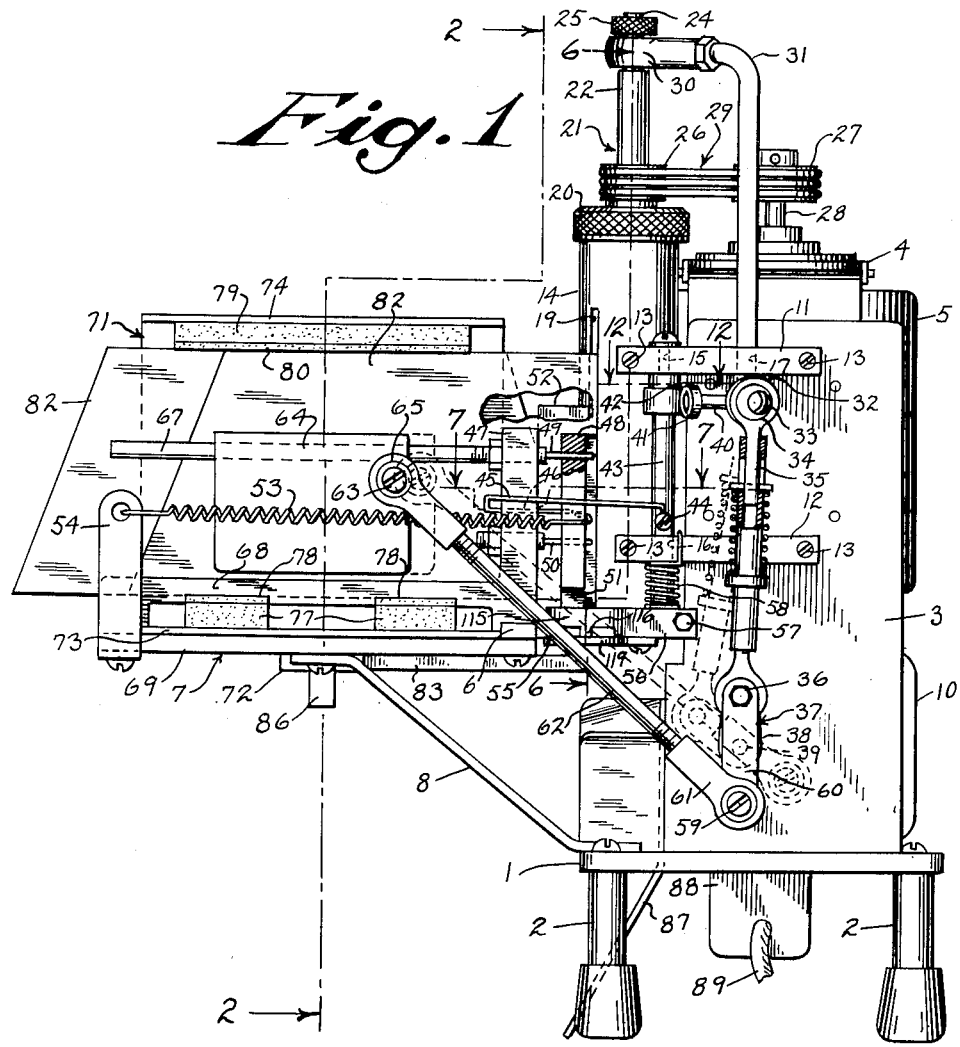
FIG. 1 is a side elevation of a preferred embodiment of the present invention.
Figure 7:
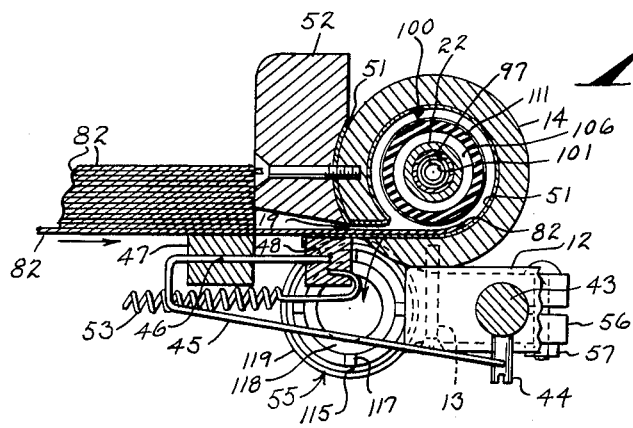
Figure 5:
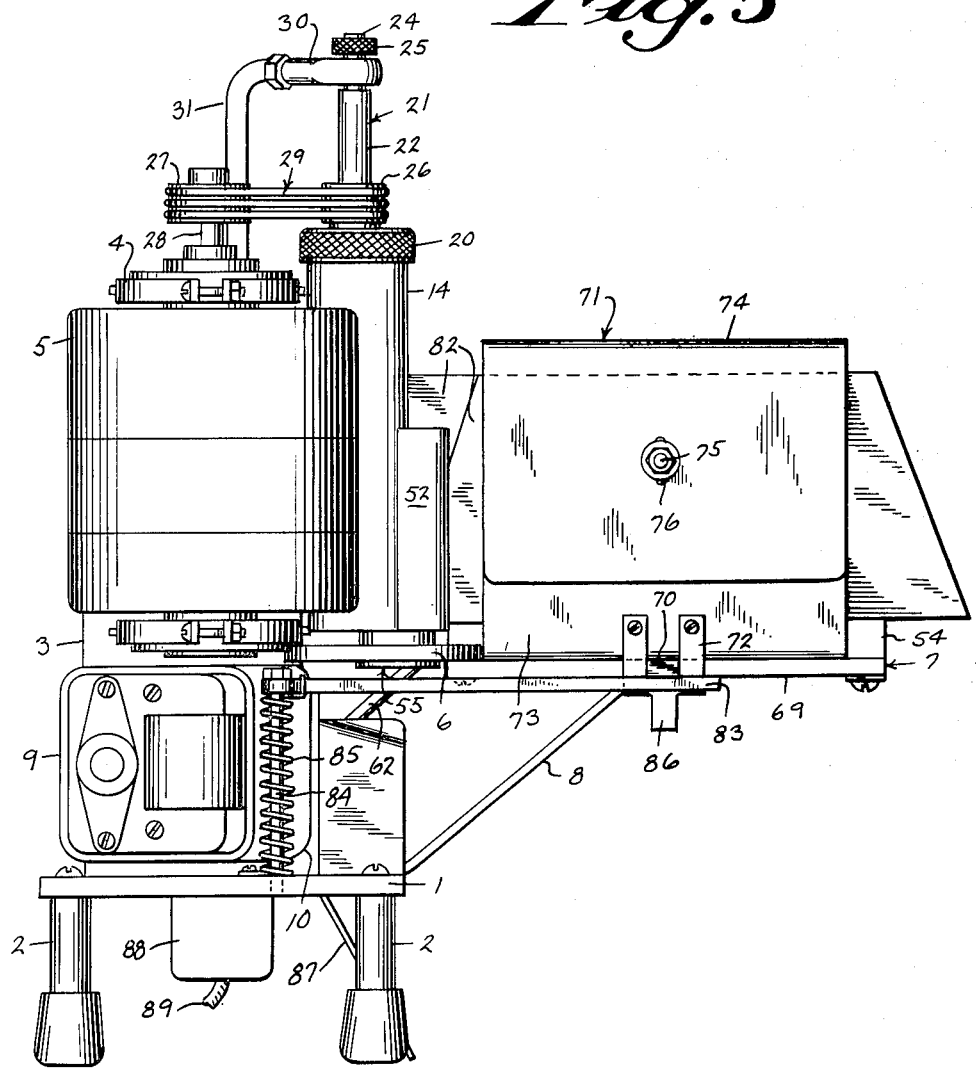
Figure 12:
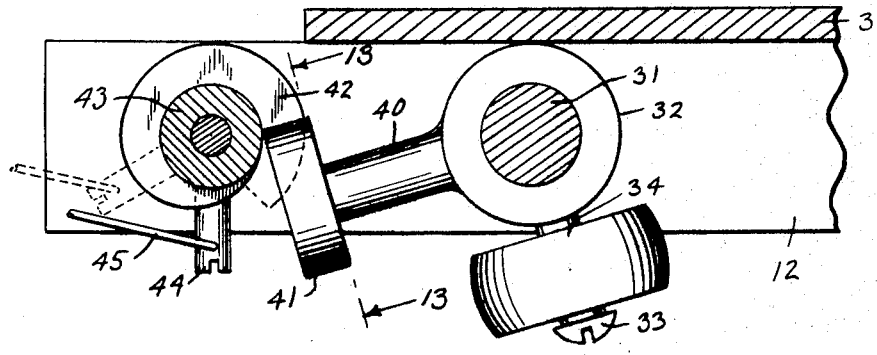
Figure 13:
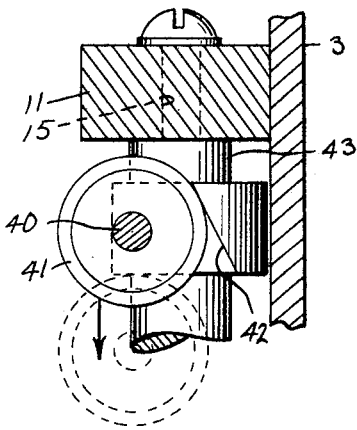
Figure 14:
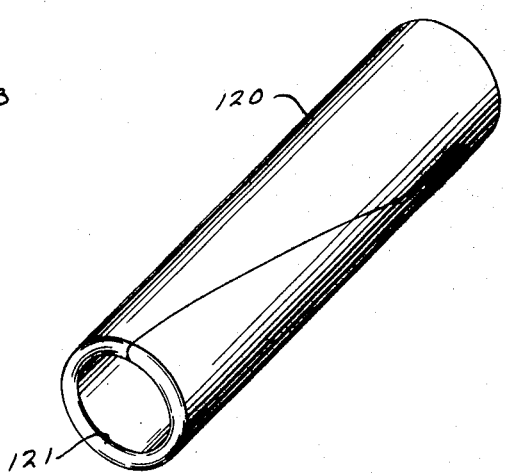

FIG. 4 is a top plan view of the embodiment shown in FIG. 1 having portions cut away, FIG. 5 is a view in elevation of the opposite side to that shown in FIG. 1, FIG. 6 is a view in section of a housing, spindle and crimping die used in the present embodiment, FIG. 7 is a view in section of the cylinder and spindle of the present invention taken along the lines 7—7 in FIG. 1, FIG. 8 is another view in section of the cylinder, spindle and crimper of the present invention taken along the line 7—7 in FIG. 1, FIG. 9 is a side elevation view of the present embodiment, FIG. 10 is a view in section of the cylinder and spindle of the present invention taken along the line 7—7 in FIG. 1, FIG. 11 is a longitudinal sectional view of a housing, spindle and crimping die in the present embodiment, FIG. 12 is a view partially in section of cam mechanism in the present embodiment taken along the line 12—12 in FIG. 1, FIG. 13 is a view of the cam and roller taken along the line 13—13 of FIG. 12, and FIG. 14 is a perspective view of a pre-crimped coin wrapper formed by a machine of the present invention.

Figures 2, 3:
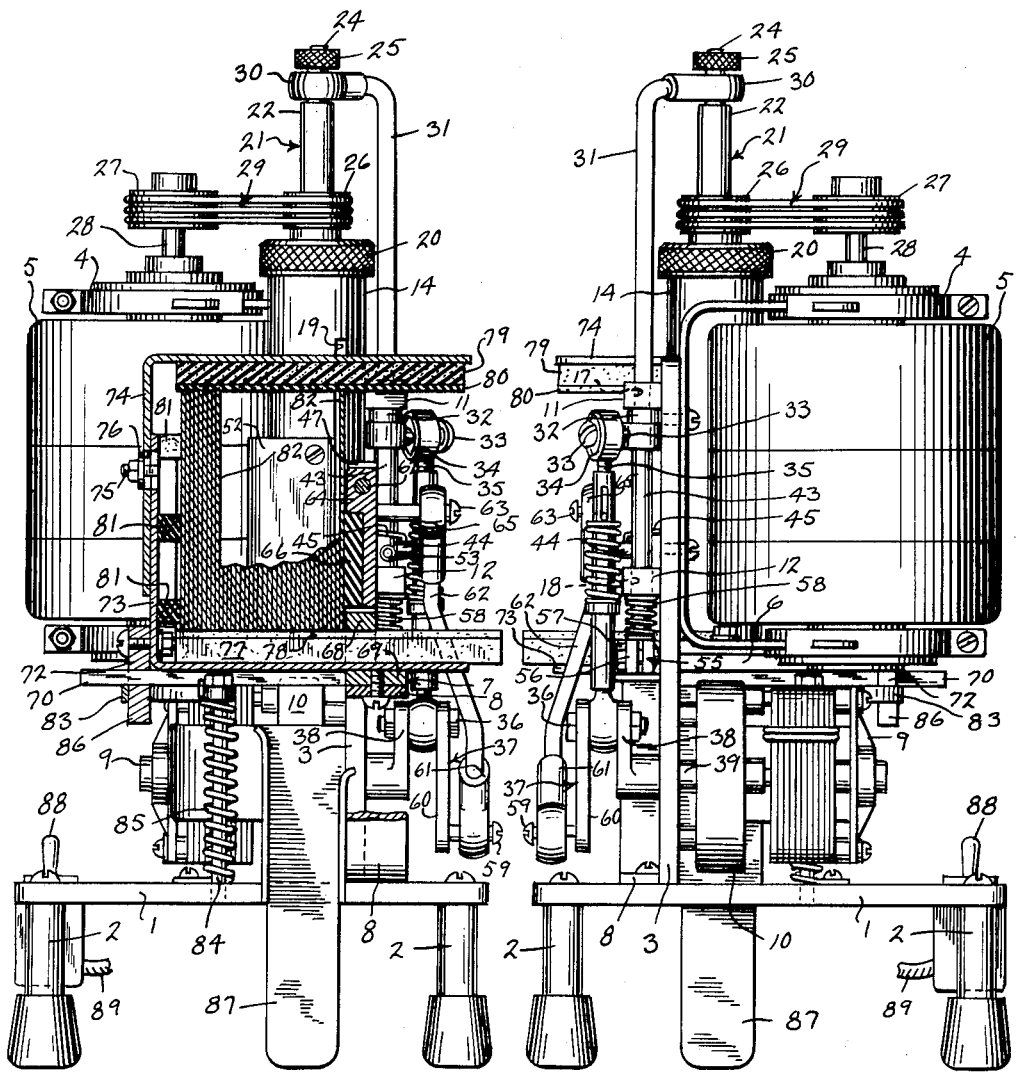
FIG. 2 is a front view partially in section along the line 2—2 in FIG. 1.
FIG. 3 is a rear view of the embodiment shown in FIG. 1.

Referring now specifically to FIGS. 1, 2 and 3 of the drawings, the embodiment of the present invention shown is supported on the chassis consisting of a platform 1 which stands on four legs 2 and has a plate 3 mounted vertically on its top surface. A commercially available C-shaped motor mount 4 is bolted to one side of the vertical plate 3 and it supports a vertically mounted spindle drive motor 5. A horizontal frame member 6 is bolted to the bottom of the C-shaped motor mount 4 and extends forwardly of the vertical plate 3 to support an after end of a hopper feed bracket 7, while a brace 8, extending downward from the bottom of the hopper feed bracket 7 to the top surface of the platform 1, adds support to the center and forward portion of the hopper feed bracket 7. Mounted beneath the spindle drive motor 5 is a low speed crank drive motor 9, which drives a reduction gear transmission 10 lying between it and the vertical plate 3.

A pair of horizontal bar supports 11 and 12 are fastened to another side of the vertical plate 3, visible in FIG. 1, and they extend beyond the front edge of the vertical plate 3. A pair of vertically-oriented bearings 15 and 16 are concentrically aligned in the bar supports 11 and 12 respectively, and a pair of vertically-oriented, concentrically aligned shaft guides 17 and 18 are bored through the bar supports 11 and 12 to the rear of bearings 15 and 18. An open-end cylindrical housing 14 is vertically mounted, by screws 13, on the forward projecting portions of the horizontal bar supports 11 and 12. The housing 14 has a forward-opening, vertical input opening in the form of a slot 19 through its wall tangential to its interior surface, and a cap 20 is screw fitted over its top end. A spindle 21 is mounted for rotational and axial movement inside the cylinder 14 and its main shaft 22 projects upward through an opening 23 in the cap 20.

An upper portion 24 of the main shaft 22 having a reduced diameter is visible outside the housing 14 and a round retaining nut 25 is screw fitted to the top of the reduced upper portion 24. Beneath the reduced upper portion 24, a multiple groove driven pulley 26 is nonrotatably mounted about the main shaft 22 in a manner to be described later, and a corresponding multiple groove drive pulley 27 is set screw fastened to a drive shaft 28 of the spindle drive motor 5. Three round rubber belts 29 connect the two pulleys 24 and 25.

The upper portion 24 of the main shaft 22 is journaled through a swivel bearing 30 on the end of a spindle control arm 31. The spindle control arm 31 extends vertically downward from the swivel bearing 30 through the concentric shaft guides 17 and 18 in the respective horizontal bar supports 11 and 12. A hub 32 is set-screw fastened to the spindle control arm 31 between the shaft guides 17 and 18, and it has a stub shaft 38 extending horizontally and journaled in a swivel bearing 34 on a telescoping, spring-loaded connecting rod 35. The opposite end of the connecting rod 35 is journaled about a crank pin 36 on a crank 37, an inner leg 38 of which is secured by a set screw to a drive shaft 39 of the reduction gear transmission 10. Also mounted on the hub 32 is a cam lever in the form of a radially extending axle 40 with a vertically aligned cam wheel 41 on its end.

The cam wheel 41 is positioned to bear upward against a cam surface 42 on a crimper control shaft 43 (as is shown in FIGS. 12 and 13) which is journaled in the bearings 15 and 16 in the horizontal bar supports 11 and 12. Just above the lower horizontal bar support 12 a former arm 45 is attached to a lever 44 projecting from the crimper control shaft 43. The former arm 45 extends forward beyond a vertical member 47 on the rear of the hopper feed bracket 7, and then it is doubled back through a guide 46 bored horizontally through the vertical member 47. After passing through the guide 46, the former arm 45 is fastened to a frame member 48, which is slidably mounted on two supporting rods 49 and 50 extending rearward from the vertical member 47 of the hopper feed bracket 7 through the frame member 48.

The frame member 48 is fastened to one end of a former 51, consisting of a thin brass sleeve which passes inward through the input opening 19 in the housing 14. After entering the opening 19, the former 51 follows the interior surface of the housing 14 back to the opening 19, where it passes out and is secured to the external surface of the housing 14 by means of a screw mounted clamping plate 52. An open spiral tension spring 53 has one end secured to the frame member 48 and its other end anchored to a post 54 on the forward end of the feed bracket 7, so that it tends to pull the frame member 48 to its forwardmost position, causing the former 51 to contract away from the inner surface of the housing 14.

A crimping die 55 extends from a clip boss 56 fastened by a bolt 57 about the bottom of the crimper control shaft 43, so that it may be positioned beneath and in coaxial alignment with the housing 14. A torsion spring 58 around the lower end of the sleeve control arm 50 has one end anchored to the lower horizontal bar support 12 and its other end fastened to the clip boss 56 so as to urge the crimping die 55 laterally from beneath and completely out of alignment with the housing 14.

A pin 59 extending from the end of an outside leg 60 of the crank 37 is journaled in a swivel bearing 61 on one end of a feed drive link 62. A peg 63 projecting perpendicularly from a feed hand 64 is journaled through a swivel joint 65 on the upper end of the feed drive link 62. The feed hand 64 is suspended for reciprocating along a horizontal rod 67 which passes through a hole adjacent the top of the feed hand 64, and a lower portion of its inner surface is provided with a lining or cleats 66 of one of the well known, rubber-like materials which have high coefficients of friction and good wear qualities. The horizontal rod 67 is anchored in the upper end of the vertical member 47 of the feed hopper bracket 7.

The feed hopper bracket 7 has two, vertically spaced, horizontal members 68 and 69 extending forward from its vertical member 47 and a track 70 extending laterally from the center of the lower horizontal member 69. A hopper 71, which has a U-shaped guide 72 secured to its bottom section 73 to fit loosely about the horizontal track 70, rides upon the track 70. A top section 74 of the hopper 71 is fastened to the bottom section 73 by means of a bolt 75 which passes through vertical slots 76 in the vertical portions of the top and bottom sections 73 and 74 to permit adjustment of the vertical dimension of the hopper 71. A pair of feet 77, made of rectangular metal bars, extend horizontally across the floor of the bottom section 73 of the hopper 71. The bottom section 73 of the hopper 71 and the feet 77 slide between the horizontal members 68 and 69 of the feed hopper bracket 7. The tops of the horizontal feet 77 are lined with rubber or a rubber-like material 78 to present a surface having a high coefficient of friction. The inside of the top section 74 of the hopper 71 is lined with a layer of resilient sponge material 79, which has a layer of rubber or rubber-like material 80 bonded to its downward facing surface to present a surface having a high coefficient of friction. Strips of resilient sponge material 81 are secured to the vertical portion of the bottom section 73 of the hopper 71 to provide a resilient back for blanks 82 in the hopper 71.

A hopper drive arm 83 extends forward from the upper end of a post 84, which is anchored in the platform 1 just beneath the spindle drive motor 5, to bear against a vertical finger 86 extending downward from the U-shaped guide 72, and to urge the hopper 71 toward the feed hand 64. A torsion spring 85 about the post 84 has its lower end fastened to the plate 1 so that its upper end may bear against the hopper drive arm 83.

An output chute 87 is located beneath the lower end of the housing 14, and it is secured to the platform 1. An on-off switch 88 is mounted on a platform 1 beneath the spindle drive motor 5, and a power cord 89 extends from the switch 87.

Turning now to the internal mechanism that actually performs the coin wrapper forming and crimping functions, which is best illustrated in FIGS. 6, 8, 9, 10 and 11, the spindle 21 is made up of the main shaft 22, the externally visible portion of which has already been described. A bushing 91 is nonrotatably, but axially slidably mounted about the main shaft 22 below the reduced upper portion 24. The pulley 26 is set-screw fastened to the top of the bushing 91, and a pair of antifriction bearings 90 are mounted about the bushing 91 just below the pulley 26 and within the housing 14. The antifriction bearing 90 rests on a ring 94 on a bearing seat 95 formed on the inside surface of the cylinder 14 by the increased diameter of the bearing seat area inside the top portion of the housing 14. An annular rim 96 extends outward from the bottom of the bushing 91 to hold the bearings 90 against axial movement relative to the bushing 91.

The lower portion of the main shaft 22 is hollow and adapted to receive a tubular central shaft 97. The central shaft 97 has an annular shelf 98 and hub 99 formed on its external surface and spaced from its bottom to support one end of an axially compressible, radially expandable mandrel 100. A tension spring 101 has its upper end secured about a pin 102 inside the hollow portion of the main shaft 22 near the top, and passes through the center of the tubular central shaft 97 to where its lower end is hooked about the bottom of the central shaft 97 so that it urges the central shaft 97 upward inside the main shaft 22. The compressible mandrel 100 is mounted on the lower end of the main shaft 22 between the shelf 98 on the central shaft 97 and a flange 103 formed about the main shaft 22 below the bushing 91.

The compressible mandrel 100 is made up of three metal mandrel cylinders 104, 105 and 106 of which the uppermost mandrel cylinder 104 is secured against rotation relative to the main shaft 22 by means of a key 107 extending from the main shaft 22 into a keyway 108 in the mandrel cylinder 104. The top mandrel cylinder 104 bears against the flange 103 on the main shaft 22, and has a hub 109 of reduced outer diameter. The other two mandrel cylinders 105 and 106 each have hubs 109 of reduced diameters on their upper and lower ends. Deformable elastic tube sections 110, 111 and 112 are tightly fitted about the hubs 109 on the metal cylinders 104, 105 and 106 to connect them together and maintain an axial space between them. The lowermost deformable elastic tube 112 grips the hub 99 on the central shaft 97. Beneath the shelf 98 a sliding metal collar 113 fits about the central shaft 97 and is biased downwardly by a compression spring 114 about the central shaft 92 between the sliding collar 113 and the shelf 98.

The crimping die 55 has an outer ring 115 with an internal diameter equal to the internal diameter of the cylindrical housing 14, and four legs 116, spaced 90° apart, extending downward from its bottom edge. At the foot of each of the four legs 116 a rounded nub 117 extends inward. An inner ring 118 secured to the outer ring 115 fits inside the nubs 117 on the legs 116, and it has an annular flange 119 about its bottom edge abutting the feet of the legs 116 on the upper ring 115.

Before considering the operation of the machine as a whole, the functional relationship of the various parts of the forming and crimping mechanism, which consists broadly of the housing 14, the spindle 21, the former 51, and the crimper 55, should be examined with particular reference to FIGS. 6–11. The spindle 21 is mounted for rotational movement by means of the antifriction bearings 90 and for limited axial movement, by means of the bushing 91 which is keyed against rotation with the main shaft 22, but which fits loosely about the main shaft 22 so that the main shaft 22 may slide up and down in the bushing 91. The extent of the axial movement of the main shaft 22 in the bushing 91 is limited by the length of the kerf 93 in which the key 92 on the bushing 91 slides.

The spindle 21 is illustrated at the top of its axial stroke in FIG. 6. The key 92 rests in the bottom of the kerf 93, and the flange 103 about the main shaft 22 is drawn up just beneath the annular rim 96 on the bottom of the bushing 91. The bottom of the central shaft 97 is above the bottom of the housing 14, and the sliding collar 113 rests about the bottom of the central shaft 97 on the lower end of the tension spring 101, which hooks around the bottom edge of the central shaft 97. Since the resistance of the elastic tube members 110, 111 and 112 to axial compression is greater than the force of the tension spring 101, the compressible mandrel 100 is fully extended to its greatest, normal length. When the spindle 21 is in this position, the crimping die 55 is pivoted out of alignment with the housing 14 to clear the bottom, open end of the housing 14, and the former 51 is expanded to its largest diameter, bearing against the inside surface of the housing 14 and completely releasing the mandrel 100. At this point in the cycle, a finished, formed and crimped wrapper 120 falls out of the bottom of the housing 14 as a blank 82 is being fed into the housing 14 through the input opening 19 and between the former 51 and the mandrel 100, as is shown in FIGS. 7 and 8.

As the spindle 21 begins its down stroke, the crimping die 55 is pivoted back into position under and concentrically aligned with the bottom of the housing 14 and the former 51 is contracted about the mandrel 100. FIGS. 9, 10 and 11 show the spindle 21 in its lowest position at the bottom of the down stroke. FIG. 11 shows the key 92 on the bushing 91 at the top of the kerf 93, and the flange 103 on the main shaft 22 is spaced well below the rim 96 at the bottom of the bushing 91. The downward motion of the main shaft 22 has driven the sliding collar 113 at the lower end of the central shaft 97 against the inner ring 118 of the crimping die 55. The continued downward movement of the main shaft 22 has caused the inner ring 118 to force the sliding collar 113 upward on the central shaft 97, the lower end of which passes through the hollow center of the inner ring 118. The movement of the sliding collar 113 along the central shaft 97 completely compresses the compression spring 114 until it serves as a solid sleeve bearing against the shelf 98 on the central shaft 97, so that the central shaft 97 is forced to telescope into the main shaft 22. Hence, the compressible mandrel 100, mounted between the shelf 98 on the central shaft 97 and the flange 103 on the main shaft 22 is axially compressed by deforming the elastic tube sections 110, 111 and 112 radially outward as the mandrel cylinders 104, 105 and 106 are forced closer together.

The result of the axial compression of the compressible mandrel 100 is twofold. First, since the formed blank 82 adheres to the high friction surface of the flexible tube sections 110, 111 and 112 and hence is fixed to the surface of the rotating mandrel 100, the compression of the mandrel 100, in effect, retracts the bottom of the mandrel 100 to expose the edge of the blank 82 to be crimped to the crimping die 55. Second, as the mandrel 100 is compressed, the tube sections 110, 111 and 112 deform by radially increasing their outer diameters so as to expand the diameter of the formed blank 82 before it is crimped and fixed in its final form, so that it may be readily released from the mandrel 100 by extending the mandrel 100 to reduce its diameter. Although the radial expansion of the mandrel also serves to grasp the blank 82 more tightly during the crimping operation, that grasping effect could be achieved by drawing up the former 51 more tightly. The blank 82 could also be formed about a mandrel which is not axially compressible provided that a lower portion of the formed blank 82 would overhang the bottom of the mandrel, and hence be exposed for crimping. It should be pointed out that the sliding collar 113 also performs two functions: first, it maintains the shape of the exposed portion of the formed blank 82; and, second, it guides the bottom edge of the blank 82 upturned by the crimping die 55 back outward and downward to complete the rolled crimp. It is now also evident that while the housing 14 encloses and supports the elements described, it does not perform any part of the actual forming and crimping operations, and hence another suitable supporting frame could be substituted for it.

To operate the entire machine, it is necessary, first, that the spindle drive motor 5 be operating to cause the spindle 21 to rotate rapidly. The crank drive motor 9 may then be started to drive the reduction gear transmission 10. The transmission output shaft 39 rotates in a counter-clockwise direction to drive the crank 37. Although the operation is, of course, continuous, in the following discussion it will be treated, for the purpose of clarity, in four steps corresponding to the cardinal points of a circle described by the rotation of the crank pin 36.

In the first thus arbitrarily selected position, the crank legs 38 and 60 are vertical and the crank pin 36 is in its highest position. Hence, the connecting rod 35 is vertical and in its highest position, lifting the control arm 31, and in turn, the spindle 21 to the top of their strokes as shown in FIGS. 1, 2, 3 and 6. In this position, the crank pin 36 is driven to a higher relative position than the spindle 21, and the difference is absorbed by the telescoping compression of the spring loaded connecting rod 35. When the spindle 21 is in its highest position, the mandrel 100 is extended to its normal length and contracted to its normal diameter to release a completed coin wrapper 120 which it has just formed and crimped. The cam wheel 41 is at the top of the cam surface 42, forcing the crimper control shaft 43 to pivot to its counterclockwise position. The rotation of the crimper control shaft 43 draws the former arm 45 rearward against the force of the tension spring 53 to permit the resilient former sleeve 51 to expand to its greatest diameter against the inside surface of the cylinder 14. Also, the rotation of the crimper control shaft 43 pivots the crimping die 55 out from under the cylinder 14. The positions of the members controlled by the crimper control shaft 43 may be viewed in FIGS. 4, 7, 8, 12 and 13. The feed drive link 62 is in a mid-position, drawing the feed hand 64 to a point midway in its rearward stroke along a horizontal rod 67. The downward and rearward pulling action of the feed drive link 62 causes the lower end of the feed hand 64 to be pivoted inward about the horizontal rod 67 against the blanks 82, so as to pull the immediately adjacent blank 82 along with it towards the input opening 19 in the housing 14.

In a second position, the crank legs 38 and 60 are horizontal and the crank pin 36 is moved to its forwardmost position, causing the connecting rod 35 to be in a mid-position vertically speaking and slanting forward. Hence, the spindle control arm 31 and the spindle 21 are also in mid-positions, but the spindle 21 has not driven down far enough to cause the mandrel 100 to expand. Thus, the mandrel 100 remains in its extended, normal condition. The cam wheel 41 is now at the bottom of the cam surface 42, so that the crimper control shaft 43 is permitted to pivot clockwise under the force of the tension spring 53 and the torsion spring 58. The former arm 45 being pulled to its forwardmost position by the tension spring 53, draws the former 51 forward out of the slot 19, contracting the former 51 about the mandrel 100, confining the blank 82 between it and the surface of the mandrel 100. The crimping die 55 is now positioned in concentric alignment with the lower end of the housing 14 and the mandrel 100. The feed drive link 62 has drawn the feed hand 64 to its rearmost position, pulling the adjacent blank 82 through the input opening 19 into the housing 14 as may be seen in FIG. 7.

In the third selected position, the legs 38 and 60 have rotated to the vertical, with crank pin 36 in its lowest position, drawing the connecting rod 35 vertical and to its lowest position. The connecting rod 35 forces the spindle control arm 31 to its lowest position which in turn forces the spindle 21 downward within the housing 14 as illustrated in FIG. 11. Since the cam wheel 41 was already at the bottom of the cam surface 42, the continued downward movement of the cam wheel 41 along with the spindle control arm 31 can have no effect upon the crimper control shaft 43. Hence, the crimping die 55 remains in its position beneath and in alignment with the end of the housing 14, and the former 51 remains in its contracted position. Thus, when the spindle 21 is forced downward, the rapidly rotating mandrel 100 is axially compressed, exposing the bottom edge of the formed blank 82 to the crimping die 55, and is radially expanded to define the inner diameter of the formed blank 82. As the spindle 21 is forced downward to its lowest position the rapidly spinning blank 82 is forced against the nubs 117 on the ends of the legs 116 of the outer ring 115 of the crimping die 55, and the nubs 117 cooperating with the inner ring 118 cause the bottom edge of the blank 82 to be rolled inward and doubled back upwards, where it engages the sliding collar 113, forcing it back downward to effect the rolled crimp shown in FIGS. 11 and 14.

The crank 37 continues to rotate in a counterclockwise direction to its fourth position where the crank legs 38 and 60 are horizontal and the crank pin 36 is in its rearmost position, causing the connecting rod 35 to slant to the rear and holding it in a mid-position. This movement raises the spindle control arm 31 upward to its mid-position lifting the spindle 21 to a point midway in its stroke, pulling the sliding collar 113 and the now formed and crimped wrapper 120 away from the crimping die 55. This movement permits the mandrel 100 to extend back to its normal length under force of the elastic tube sections 110, 111 and 112. The cam wheel 41 is drawn up to the bottom of the cam surface, but it has not yet engaged the cam surface. Hence, the former arm 45 remains in its forwardmost position under the force of the tension spring 53, which pulls the former 51 in its contracted position about the mandrel 100. Also the crimping die 55 remains beneath the housing 14. The feed drive link 62 is now moved from its rearmost position forward to a point midway in its reciprocal movement between the back and front of its stroke. Hence, the feed hand 64 is also midway between the back and front of its stroke, and since it is being pushed forward and upward by the feed drive arm 62, the lower portion of the feed hand 64 is pivoted outward about the horizontal rod 67 away from the blanks 82 in the hopper 71.

As the crank 37 continues to rotate it approaches its first position again where the crank legs 38 and 60 are vertical and the crank pin 36 is in its highest position. In this position, it will be recalled that the mandrel 100 is extended, the former 51 is drawn back to its expanded position against the inside surface of the housing 14 to completely release the completed pre-crimped coin wrapper 120, and the crimping die 55 is pivoted away from the bottom of the cylinder 14 permitting the pre-crimped coin wrapper to drop out of the cylinder 14 onto the output chute 87.

The foregoing paragraph sets forth in detail a description of a preferred embodiment of the present invention, but it will be evident to those skilled in the art that the details shown and described do not exhaust the equivalent devices that may be substituted for the various elements described. For example, it will be apparent that one motor could perform the functions of both the spindle drive motor 5 and the crank drive motor 9 shown in the preferred embodiment. While the preferred embodiment relies upon the force of gravity to cause the completed pre-crimped coin wrapper 120 to drop out of the cylinder 114, a positive ejection device might be advantageously added, perhaps in the form of a vertically-oriented rapidly rotating wheel or some other such device. Also, different variations of expandable mandrels will come to mind in addition to the alternatives already mentioned. For example, it may be desirable to replace the hubs 109 and the mandrel cylinders 104, 105 and 106 with tapering surfaces with their ends shaped so that they will interlock one with another. Then several elastic O-rings could be fitted about the interlocking reduced diameter portions of the cylinders so that when the cylinders are compressed together the O-rings would be forced upward on the tapered surfaces to effectively increase the diameter of the mandrel 100.

The suggestions of the preceding paragraph are but examples of some of the equivalents which may be substituted for the elements specifically described in connection with the preferred embodiment shown in the drawings herewith attached. Many other similar modifications will occur to the person skilled in the art. Hence, the scope of the invention is to be determined from the following claims.

We claim:
1. In a pre-crimped coin wrapper forming machine, the combination comprising:
   a rotatably mounted mandrel;
   a crimping die movably mounted to be positioned in alignment with an end of said mandrel;
   said mandrel and said crimping die being adapted for reciprocating relative axial movement;
   a former mounted to alternately contract toward and release away from said mandrel's lateral surface;
   means for rapidly rotating said mandrel;
   and mechanism for sequentially causing a wrapper blank to be fed between said rotating mandrel and said former and to contract said former toward said mandrel to form said blank about said mandrel, causing relative axial movement between said mandrel and said crimping die toward each other to force an end of said formed blank into said crimping die, causing relative axial movement between said mandrel and said crimping die away from each other, causing said crimping die to be moved out of alignment with said mandrel and causing said former to release the formed and crimped wrapper.

2. In a pre-crimped coin wrapper forming machine, the combination comprising:

a rotatably mounted axially compressible mandrel;

a crimping die movably mounted to be positioned in axial alignment with an end of said mandrel and said crimping die being adapted for relative reciprocal axial movement;

a former mounted to be contracted towards said mandrel's lateral surface and cause a wrapper blank to form about said mandrel;

powered means for rapidly rotating said mandrel;

feed means to insert said wrapper blank between said mandrel and said former;

means for imparting relative reciprocating axial movement between said mandrel and said crimping die, compressing said mandrel to expose an end portion of said formed wrapper blank, forcing said end of said wrapper blank into said crimping die to be crimped thereby and pulling said mandrel away from said crimping die;

and means for moving said crimping die in and out of axial alignment with said mandrel.

3. In a pre-crimped coin wrapper forming machine, the combination comprising:

a spindle rotatably mounted for limited axial movement and having a concentric mandrel nonrotatably secured to it;

a crimping die movably mounted to be positioned in alignment with an end of said mandrel;

a former adapted to contract toward and release away from said mandrel's surface;

a power source connected to rotate said spindle rapidly;

an output shaft connected to be rotated relatively slowly and having one leg of a crank mounted on it;

a spindle control arm having one end fastened to said spindle, and being connected to be driven by said crank to impart reciprocating axial movement to said spindle when said output shaft rotates;

and means to simultaneously cause said former to contract towards said mandrel and said crimping die to move into axial alignment with said mandrel, and subsequently to simultaneously cause said former to release said mandrel and said crimping die to move out of axial alignment with said mandrel.

4. In a pre-crimped coin wrapper forming machine, the combination comprising:

a mandrel rotatably mounted for limited axial movement;

a former adapted to contract toward and release said mandrel's surface;

a power source connected to rotate said mandrel rapidly;

a crank having one leg fastened to a relatively slowly rotating output shaft and a pin in said leg journaled in an end of a connecting rod;

a spindle control arm mounted for axial movement, having a cam lever extending laterally, being connected to impart axial movement to said mandrel, and being connected to receive reciprocating movement from said connecting rod as said crank rotates on said output shaft;

a crimper control shaft rotatably mounted, having a cam surface adapted to be engaged by a cam lever on said reciprocating spindle control arm to receive pivotal motion therefrom, being connected to cause by its pivotal motion said former to contract toward and release said mandrel, and having a crimping die extending from it to be moved in and out of alignment with said mandrel as said crimper control shaft pivots.

5. In a pre-crimped coin wrapper forming machine, the combination comprising:

a spindle rotatably mounted for limited axial movement, having a main shaft at least a portion of which is hollow, a central shaft telescoped within said hollow portion of said main shaft and extending from one end of said main shaft, and a compressible mandrel concentric with said main shaft and said central shaft and having one end nonrotatably mounted about said main shaft and another end secured to said central shaft;

a crimping die movably mounted to be positioned in alignment with an end of said mandrel and adapted to limit axial movement of said one end of said mandrel;

a stationary former adapted to grip and release said mandrel's surface;

a power source connected to rotate said spindle rapidly;

means for imparting reciprocating axial motion to said spindle;

and means for simultaneously causing said former to contract toward said mandrel and said crimping die to move into alignment with said mandrel, and subsequently causing said former to release said mandrel and said crimping die to move out of axial alignment with said mandrel.

6. In a pre-crimped coin wrapper forming machine, the combination comprising:

a spindle rotatably mounted for limited axial movement, having a main shaft at least a portion of which is hollow, a central shaft telescoped within said hollow portion from said main shaft and extending from one end of said main shaft, and a radially expandable axially compressible mandrel concentric with said main shaft and said central shaft and having one end nonrotatably mounted about said main shaft and another end fastened to said central shaft;

a crimping die movably mounted to be positioned in alignment with said end of said mandrel and adapted to limit axial movement of said end of said mandrel causing said mandrel to be axially compressed and radially expanded upon axial movement of said spindle;

a former adapted to contract toward and release said mandrel's surface;

a power source connected to rotate said spindle rapidly;

means for imparting reciprocating axial movement to said spindle;

and means for sequentially causing simultaneously said former to contract toward said mandrel and said crimping die to move into alignment with said mandrel, and causing simultaneously said former to grip said mandrel and said crimping die to move into axial alignment with said mandrel.

7. A pre-crimped coin wrapper forming machine according to claim 6 wherein said axially compressible radially expandable mandrel is comprised of at least one mandrel cylinder nonrotatably mounted about said main shaft and at least one elastic tube section in axial alignment with and connected to said mandrel cylinder.

8. A pre-crimped coin wrapper forming machine according to claim 6 wherein said former is a resilient sleeve wrapped about a large portion of said mandrel's surface, and having one end anchored, having its other end free, and being adapted to be drawn by its free end to contract about said mandrel's surface and when said free end is released to pull away from said mandrel's surface.

9. A pre-crimped coin wrapper forming machine according to claim 6 wherein said crimping die is comprised of a pair of concentric rings, an outer ring having a plurality of nubs attached to its inner surface and an inner ring mounted with its outer periphery abutting said nubs and its inner dimension being sufficient to permit an end of said central shaft to pass through it when said spindle is moved axially.

10. In a pre-crimped coin wrapper forming machine, the combination comprising:

a rotatably mounted mandrel;

a crimping die mounted to be positioned in alignment with an end of said mandrel;

a former adapted to alternately bear against and release said mandrel's lateral surface;

means for rapidly rotating said mandrel;

a wrapper blank hopper adapted to hold a stack of wrapper blanks and to present said wrapper blanks singly in alignment with and tangential to said mandrel, and being mounted to move along a line parallel to a tangent to said mandrel and perpendicular to said wrapper blanks;

a wrapper blank feed hand mounted for reciprocating motion across an end of said stack of wrapper blanks in said hopper tangential to said mandrel's surface, having its surface adjacent said end of said stack of wrapper blanks lined at least in part with a material having a high coefficient of friction, and being pivotally mounted to bear against said end of said stack of wrapper blanks during the portion of its stroke toward said mandrel and to disengage said end of said stack of wrapper blanks in a portion of its stroke away from said mandrel;

a feed hand drive link between said feed hand and a pin on a leg of a power driven crank to impart reciprocating motion to the feed hand;

means for imparting relative reciprocating axial movement between said mandrel and said crimping die;

and means for moving said crimping die into and out of axial alignment with said mandrel.

No references cited.

FRANK E. BAILEY, *Primary Examiner.*